United States Patent
Simpson

[11] 3,879,732
[45] Apr. 22, 1975

[54] MULTI-DIRECTIONAL BARRAGE JAMMING SYSTEM

[75] Inventor: Murray Simpson, Garden City, N.Y.

[73] Assignee: Maxson Electronics Corporation, New York, N.Y.

[22] Filed: Apr. 28, 1959

[21] Appl. No.: 809,475

[52] U.S. Cl. .............................................. 343/18 E
[51] Int. Cl. .............................................. H04k 3/00
[58] Field of Search .............. 343/18, 18 E, 18 R; 250/17; 325/132

[56] References Cited
UNITED STATES PATENTS
2,862,204  11/1958  Henrici et al. .................... 343/18 X
2,885,543  5/1959  Williams ............................ 325/17

Primary Examiner—Malcolm F. Hubler
Assistant Examiner—G. E. Montone
Attorney, Agent, or Firm—Nolte and Nolte

EXEMPLARY CLAIM

1. A jammer for radars or the like operating in a given frequency band, comprising an antenna system having an elongated radiation aperture and means for producing a multiplicity of simultaneous directional radiation beams, said means including a multiplicity of feed lines each connected so as to produce one of said beams, a plurality of fixed-tuned radio receivers each connected to one of said feed lines and having a radio frequency bandwidth sufficient to encompass said given frequency band, a transmitter for producing jamming waves having components extending throughout said given frequency band, a switching means connecting said transmitter to each feed line and responsive to the receiver connected to the same feed line, for causing said antenna system to radiate jamming waves in every direction from which signals of a predetermined amplitude are received.

8 Claims, 10 Drawing Figures

INVENTOR
MURRY SIMPSON

BY Nolte and Nolte
ATTORNEYS

(A) TRACKING RADAR ANTENNA.

(B) TRACKING RADAR ANTENNA BEAM CONFIGURATION

(C) TARGET PULSES RECEIVED BY RADAR RECEIVER

(D) DEMODULATED ERROR SIGNAL APPLIED TO RADAR ANTENNA SERVOS

FIG. 6 TRACKING RADAR ANGULAR SIGNALS

INVENTOR
MURRAY SIMPSON (A) NORMAL TRACKING RADAR WITH TRACKING GATE ON TARGET.

(B.) COUNTERMEASURED TRACKING RADAR WITH TRACKING GATE PULLED OFF TARGET.

FIG. 7 GATE SNATCHING OF TRACKING RADAR (A.) NOISE JAMMING OF RADAR PPI INDICATOR IN MODE A "HIGH GAIN MULTIDIRECTIONAL BARRAGE" JAMMING.

(B.) PULSE JAMMING OF RADAR PPI INDICATOR IN MODE D "MULTIPLE SPOT CONFUSION" JAMMING.

FIG. 8 RADAR PPI INDICATOR PRESENTATIONS UNDER MODE A AND MODE D JAMMING

FIG. 9 INDICATOR USED WITH MULTIDIRECTIONAL BARRAGE JAMMING SYSTEM

MULTI-DIRECTIONAL BARRAGE JAMMING SYSTEM

The present invention relates to a radar jamming system.

The system according to the invention is designed to provide continuous, noise modulated, jamming signals in the microwave region of 1,000 – 40,000 megacycles, over frequency bands of 1,000 megacycles or more, for the purpose of interfering with radar operation. The particular embodiment of the invention herein disclosed in designed to have the following capabilities:

1. Continuous frequency coverage in the microwave region, over a minimum band of frequency of 1,000 megacycles.
2. Freedom from tuning of receiver or transmitter elements in the jammer.
3. High antenna gain for transmission and reception of jamming signals.
4. Ability of defeating multiple target, passive detection which makes use of noise correlation techniques.
5. Instantaneous response (dependent on R-F switch speed) to radar signals from any direction and within the overall frequency band of the system.
6. Flexibility of transmitter — can use any wideband noise source, such as a frequency swept Carcinotron or traveling wave tube. This equipment is designed to operate either as an airborne, ground-base or shipboard jamming system and to render ineffective operation of radars which are equipped with the latest counter-countermeasures improvements. These improvements may include rapid frequency tunability, as much as on a pulse-to-pulse basis; passive detection capability wherein a radar can obtain a fix on a jammer by the use of several passive directional receivers and correlation techniques to identify a particular jamming source from others that may be in the area; and various counter-countermeasures circuit improvements in the radar which result in the requirement to increase the jamming-to-signal ratio as much as 20 db. The present system responds instantaneously to a radar signal and provides continuous jamming of the frequency band of the radar so that no range data can be obtained by the radar.

The invention will be fully understood from the following description and the accompanying drawing, in which:

FIG. 2b shows a radiation pattern of the antenna of FIG. 2a;

FIG. 9 is a drawing of the directional information display means. The basic problem of a continuous wave, noise modulated jammer is to provide a sufficient number of watts per megacycle within the target radar bandwidth. This may be done either by increasing the amount of transmitter power or by making use of additional directivity in the antenna, which has the effect of producing a greater concentration of power in the specific direction of the jammer. It is difficult to increase the power of the transmitter due to limitations in the power capabilities of microwave transmitting tubes. The existing oscillator and amplifier tubes are able to produce in the order of 100 to 200 watts CW in the range 1,000 to 11,000 megacycles, with the lower level of power at the high end of the band. If this amount of power were to be distributed uniformly over a frequency band of 1,000 megacycles, the power density would be in the order of 0.1 to 0.2 watt per megacycle. This is far below the minimum requirements for satisfactory jamming.

The method employed according to the invention is to make use of the directivity of an antenna beam in order to increase the effective power at the jammer. The use of directive antennas for the purpose of jamming has been limited due to the necessity for extremely wide angle of coverage for the jammer. This is so since the radars to be jammed may exist in any azimuth direction over a total angle of 360°, with relation to the aircraft carrying the jammer. Moreover, it is necessary to provide capability in the jammer to operate against a number of radars simultaneously, since jamming only one when there may be others which can provide sufficient data to the enemy for the purpose of search, acquisition and track, would be of little value. It would obviously be impractical to install a number of relatively large directional antennas in the aircraft in order to provide directivity against a number of ground and airborne radar targets. For this reason, most jammers have employed relatively omnidirectional, broad beam antennas, with the result that little or no gain was provided to enhance the available power of the jamming transmitter.

The proposed jamming system makes use of a novel Multi-Directional Antenna invented by Judd Blass and disclosed in application Ser. No. 798,078 filed Mar. 9, 1959, now abandoned. This antenna is capable of providing a multiplicity of beams from a single aperture, each of which is fed from a separate source. The principal feature of an antenna of this type is that a common aperture can be used to provide this multiplicity of beams over a large angle, as wide as 90°. Moreover, the gain of each antenna can be as high as the overall size of the aperture. The antenna system shown in FIGS. 2a and 2b includes an antenna array 10 comprising radiating antenna elements 11 connected to transmission lines 12. Radiating elements 11 may be dipoles, waveguide slots, horns or any other type of radiating elements, and the transmission lines may be coaxial lines, waveguides or other suitable conductors. The antenna transmission lines 12 are connected to another group of lines 14 called antenna feed lines. Both the antenna transmission lines 12 and the feed lines 14 are terminated in resistors or non-reflecting energy absorbing terminations 16. The resistive loads 16 may be considered as having their remote ends grounded. Each antenna feed line 14 is connected to selected transmission lines 12 through directional couplers 18. The number of feed lines is equal to the number of desired directional beams. The amount of coupling that is provided at each junction point of an antenna transmission line 12 and an antenna feed line 14 is determined by the direction of the beam desired for that particular feed line. The feed lines 14 may be connected to a plurality of receiver inputs or transmitter outputs of the same carrier frequency. The several feed lines 14 may cross the antenna lines 12 at different angles in order to provide different amounts of phase delay between successive junction points and thereby produce selected different beam directions, which may have a wide angular range, for example, 90°.

An antenna beam can be pointed in the $\theta_a$ direction (see FIG. 2b) by coupling a series feed line 14 to the antenna array 10 so that the phase difference between radiating elements 11 results in maximum radiation in the $\theta_a$ direction. Similarly, a beam can be caused to radiate in the $\theta_b$ direction if a series feed line 14 with suitable phase variation between elements is connected to the antenna 10.

The system will now be described with particular reference to FIG. 1. A multi-directional antenna 10 of the type described above is employed as a transmitting and receiving antenna. Each terminal of the antenna feed line is connected to a respective crystal video receiver 20, 20A, 20N. The R-F bandwidth of this receiver is sufficient to cover the total operating frequency of the jammer. Any signal which is received by the specific beam corresponding to this line, and which is above the threshold level of the crystal video receiver 20, will produce an output in the receiver. A microwave switch 22-22N is energized by gate circuits 21-21N connected to respective receivers 20-20N to open immediately upon receipt of an acceptable signal in the corresponding crystal video receiver. This switch permits transmitted energy to pass into the particular antenna feed line and corresponding antenna beam, in the manner described below.

At the same time, an energizing signal from the receiver is passed into a switching unit 24. The output of the switching unit 24 is connected to a modulator 26. The modulator 26 is immediately switched on and applies power to the transmitter 30. The transmitter output is connected through branch lines 31, 32, 33 to the main R-F transmitter feed line 34 which is tied to each of the beams of the multidirectional antenna 10. It has previously been indicated that the switch 22-22N corresponding to the direction from which the radar signal is received, was energized, opening that particular beam line. The transmitter output will, therefore, be fed to that particular beam through the switch which was energized. This will provide transmitter power which is radiated in the direction from which the radar signal is received. The beamwidth will correspond to the maximum gain which can be provided by the total aperture of the mutli-directional antenna 10. There is, therefore, the considerable advantage of gain and directivity by the use of this system. If, as is likely, radar signals are received from several different sources within the total coverage of the multi-directional antenna, switches 22-22N in each of the beams corresponding to the direction of the sources, will be opened and the transmitter power will be distributed to each of these specific directions. The total transmitter power will, therefore, be radiated in only the specific directions corresponding to the radar sources. If only a radar in one direction exists, the full gain of the antenna will be available. If more than one radar in different directions is in operation within the total bandwidth of the system, the total transmitter power will be distributed among the specific radar sources.

Figure 1:
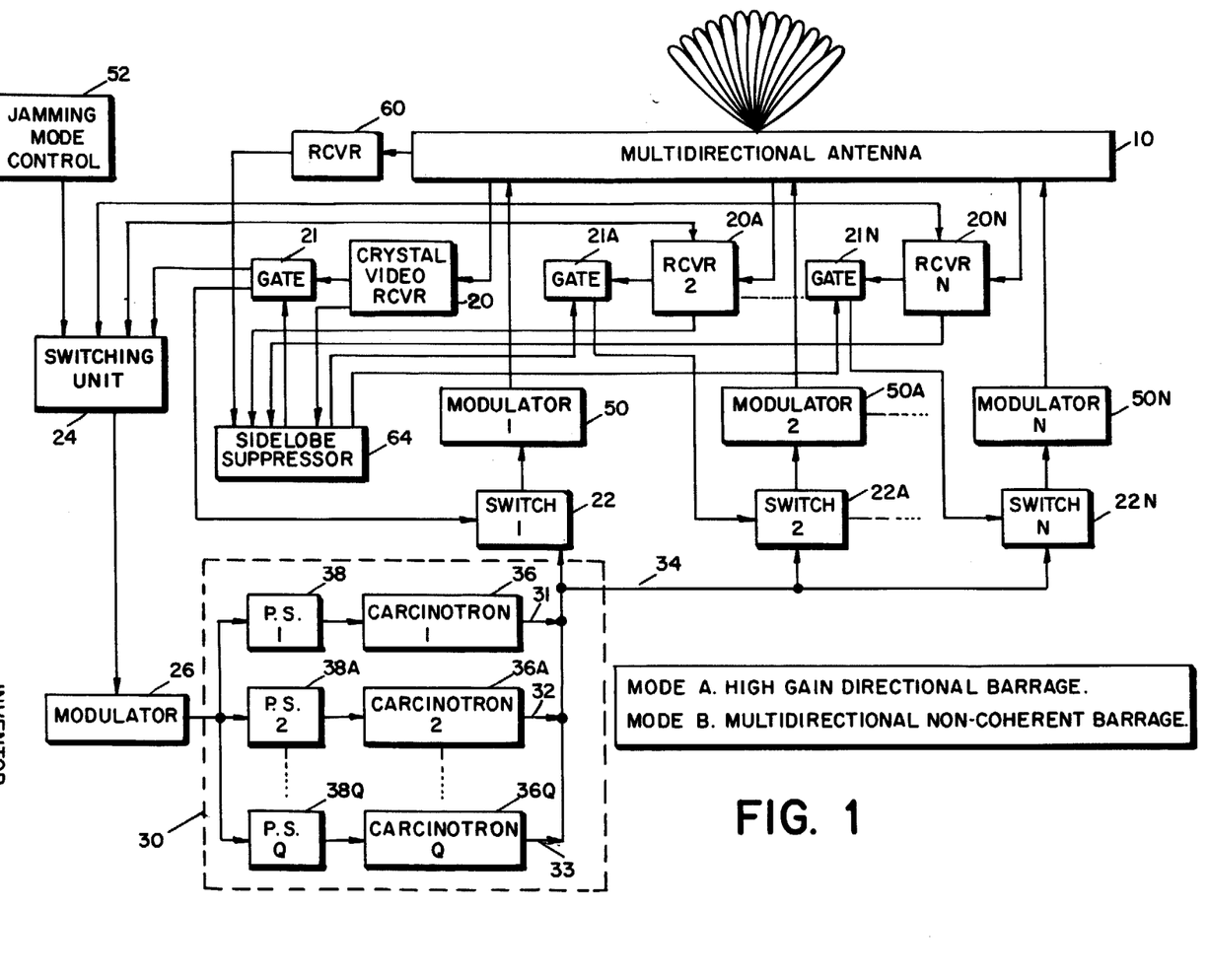
FIG. 1 is a block diagram of a multi-directional barrage jamming system.

The transmitter 30, shown in FIG. 1, is composed preferably of Carcinotron oscillator tubes 36-36Q. Each of these tubes is modulated by a noise source 38-38Q which has frequency components in the band of 50 KC to 5 MC. Modulation is applied to the "sole" electrode of the Carcinotron where very little power is required. In the diagram a total of Q Carcinotrons are shown in the transmitter 30. Each Carcinotron is modulated over a portion of the total jamming bandwidth. As an example, if a total jamming bandwidth of 1,000 megacycles is desired, each Carcinotron may be modulated on its sole electrode over a band of 200 megacycles, resulting in a need for a total of five Carcinotron tubes to make up the entire transmitter section. It should be pointed out, however, that it is not absolutely necessary to use a number of Carcinotrons. One Carcinotron may be employed and modulated over the total bandwidth of the jammer. In this case, of course, the transmitter wattage per megacycle will be reduced to the total transmitter power divided by the overall bandwidth.

The type of modulation used in the Carcinotron is frequency modulation. This has been proven to be effective against typical radar systems, provided that the deviation in the FM of the Carcinotron is at least three times wider than the radar bandwidth, a condition which is easily satisfied in the proposed jamming system.

Figure 3:
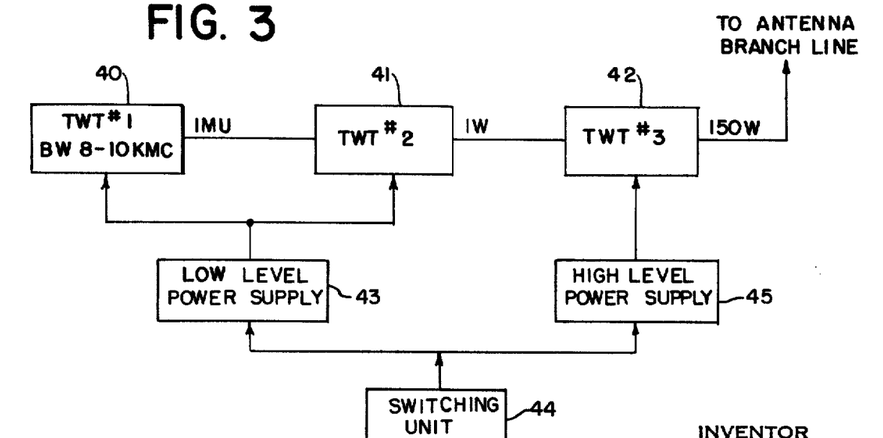
FIG. 3 is a diagram of a white noise, broadband traveling wave tube transmitting system.

There is considerable flexibility in the proposed system for the specific transmitter that is employed. As was indicated above, it is possible to use either one or more Carcinotron oscillator tubes 36 as transmitting devices. Moreover it is possible to replace the Carcinotron by wideband traveling wave tube transmitting devices. A typical system of this type is shown in FIG. 3. Herein a series of traveling wave tube amplifiers 40, 41, 42 culminate in a high power tube capable of operation over the complete jamming bandwidth. The initial signal used is best provided by a white noise source which, in this case, would be ideal for the purpose of jamming. This noise source could actually be the natural noise of the low level traveling wave tube amplifier 40. It can be seen that a transmitter of this type is extremely straightforward. It requires essentially low and high level power supplies 43 and 45 and a switching unit 44, corresponding to unit 24 of FIG. 1 for controlling the power supplies.

MODES OF OPERATION

Mode A — High Gain Directional Barrage

In this mode of operation, which is primarily useful against tracking type radars, the jamming signal is applied only in the direction in which the radar is located. All other directions in the antenna are inactivated by the R-F switches 22-22N located in the respective antenna feed lines. Therefore, the full gain of the antenna is available for jamming a particular radar. If several radars are operating simultaneously then the switches 22-22N corresponding to the directions of those radars are opened and high gain transmission will be applied again only in the directions in which the radars are actually in operation. The principal objective in this mode of operation is to obtain the greatest amount of jamming intensity in watts per megacycle against a high gain tracking type radar. The crystal video receiver 20–20N will, therefore, in this mode open up the switch 22–22N corresponding to its beam position when an acceptable radar signal is received which is above the threshold level. At the same time, the modulator 26 is turned on through the switching unit 24 and barrage transmitter power will be applied through the open switch positions against the specific radars being jammed.

A look-thru system is employed in order to determine the continued presence of the radar signals while jamming is taking place. The requirements for this look-thru are relatively small, since no transmitter tuning or receiver tuning is necessary. Were it not for the fact that sufficient isolation cannot be provided between the receiver and transmitter in order to provide necessary receiver sensitivity, the look-thru would not be necessary. However, this is not the case. As an example, it is likely that the sum of the directivity and decoupling will be in the order of 40 db in each antenna feed line. For a total possible transmitter power of 1,000 watts, a 40 db de-coupling would result in a signal of 100 milliwatts applied to the crystal video receiver 20. This is considered to be the maximum that the receiver could tolerate. Obviously this signal is well above the threshold level. Therefore, the look-thru is required.

The look-thru is designed to provide the minimum amount of information to the radar. There will, therefore be a relatively long look-thru period, in the order of several seconds. The look-thru period is determined by the maximum amount of time that the radar is in one of the beams of the antenna. The antenna has an individual beamwidth of 2½°. At a maximum angle of 45° off the perpendicular to the array plane of the antenna, at a distance of 10 miles, the aircraft will traverse approximately 1,400 feet through one beam. If the aircraft speed is in the order of Mach 1, the maximum look-thru period should be approximately one to two seconds. A figure of 2 seconds can, therefore, be taken as a satisfactory look-thru period. The look-thru ON time need only be sufficient to determine a continued presence of the radar signal. This will only require two to three radar pulses or, for typical conditions, approximately 30 milliseconds for radars whose pulse repetition frequency may be as low as 100 pps. The look-thru will operate simply by gating off the transmitter for a 30-millisecond interval and turning on the receiver. Look-thru control apparatus may be included in switch unit 24 or jamming mode controller 52. If the radar signal continues to be received, the transmitter is turned back on again anad the receiver is gated off until the next look-thru cycle. This will be applied uniformly to all Receivers in each of the antenna beam channels. Therefore, with a system of this type the duty cycle of jamming will be 98½ %, which will represent extremely effective jamming.

Mode B — Multi-Directional Non-Coherent Barrage

This mode of operation is particularly useful for jamming a search radar complex in a ground defense system, particularly a defense system which has the capability of passive detection by the use of noise correlation techniques. Passive detection can be used by the ground defense system when jamming is employed by an attacking aircraft. This can be accomplished since it is always possible for the ground radar to obtain the direction line of the jamming source, in this case, the attacking aircraft. By the use of several ground receiving systems and triangulation techniques, it is possible to obtain an absolute fix on the position of the aircraft even when no radar range information is obtained due to jamming.

Although this system is extremely effective in locating the position of a single isolated aircraft which is jamming, a substantial difficulty arises when a relatively large number of aircraft are in the area, each of which is producing jamming. Under these conditions amabiguities are produced ambiguities to direction lines which intersect each of the jamming sources. The problem is to identify which of the intersections represents the same aircraft and which represent intersections of separate jamming sources. In general, the number of ambiguities is equal to the square of the number of jamming sources or separate aircraft in the raid.

One effective technique to resolve this type of ambiguity for passive detection purposes is to make use of noise correlation techniques. The object is to correlate the noise jamming signal in order to identify a particular jamming source from all other sources. In this manner, the signals received from the several passive detection devices on the ground are brought together to a common point through transmission lines and passed through a correlator. The correlator will determine whether the noise received at the separate passive detection sites is coherent and, therefore, can be ascribed to a single jamming source. In this manner the ambiguities are resolved and it is possible to identify by triangulation techniques a fix for each of the jamming aircraft in an array.

The instant jamming system can very effectively defeat a passive detection system of this type in the following manner: Each of the antenna feed lines of the system, as shown in FIG. 1, is provided with a passive modulating device 50 through 50N. This modulator, which can be a ferrite modulator, is operated non-coherently with any other modulator by the use of noise type modulating signals. In this mode of operation all beam channels are opened up simultaneously and the barrage transmitter 30 is turned on. Signals will be radiated through each of the beam positions. However, each beam position will now radiate a signal which has been subjected to non-coherent noise modulation by the use of the ferrite modulator 50–50N in its line. Therefore, a ground detection station will receive only that signal which is being radiated from the beam directed at that ground station. A separate ground receiving system, which is part of the passive detection system, will now receive another jamming signal which is definitely non-coherent with the first. Therefore, if this is passed through a noise correlating unit it will be registered as a separate target. In this manner an extremely effective means is provided in which several aircraft can confuse very completely the operation of an otherwise highly effective, sophisticated passive detection system making use of noise correlation techniques. It is not possible for a similar effect to be obtained by other jamming systems, unless they do have the capability of very high directivity in different directions. The switches 22–22N are opened in the "multi-directional non-coherent barrage" mode of operation by adjusting the control knob in the jamming mode control to the position which would indicate non-coherent, multidirectional barrage. In this case, a bias voltage is applied through the switching unit to each of the receivers 20 to 20N. This bias voltage would activate the receivers in the same manner as if an actual signal was being received in each of the receivers 20 to 20N. In this case, each of the gates 21 – 21N would be opened, which, in turn, would energize and open each of the switches 22 to 22N. The carcinotron output which is applied to each of the switches 22 to 22N would, therefore, be directed to the antenna in such a manner that all of the beams corresponding to each of the switch positions 22 to 22N would be energized. The modulator 50 to 50N would, in this case, modulate each of these signals in a noncoherent fashion to produce a non-coherent, multidirectional barrage mode. In this mode, jamming signals radiating in different directions corresponding to the different beam positions, would be modulated with noncoherent, noise signals in accordance with the requirement of this mode of operation.

This mode of operation is extremely important in attempting to break through a modern, well equipped ground defense network, equipped with an efficient passive detection network. In this mode of operation, the receiver 20–20N is not required since all channels are operated simultaneously and the switches 22–22N in all channels are open.

Mode C – Angle Track Breaking Repeater

Figure 6:
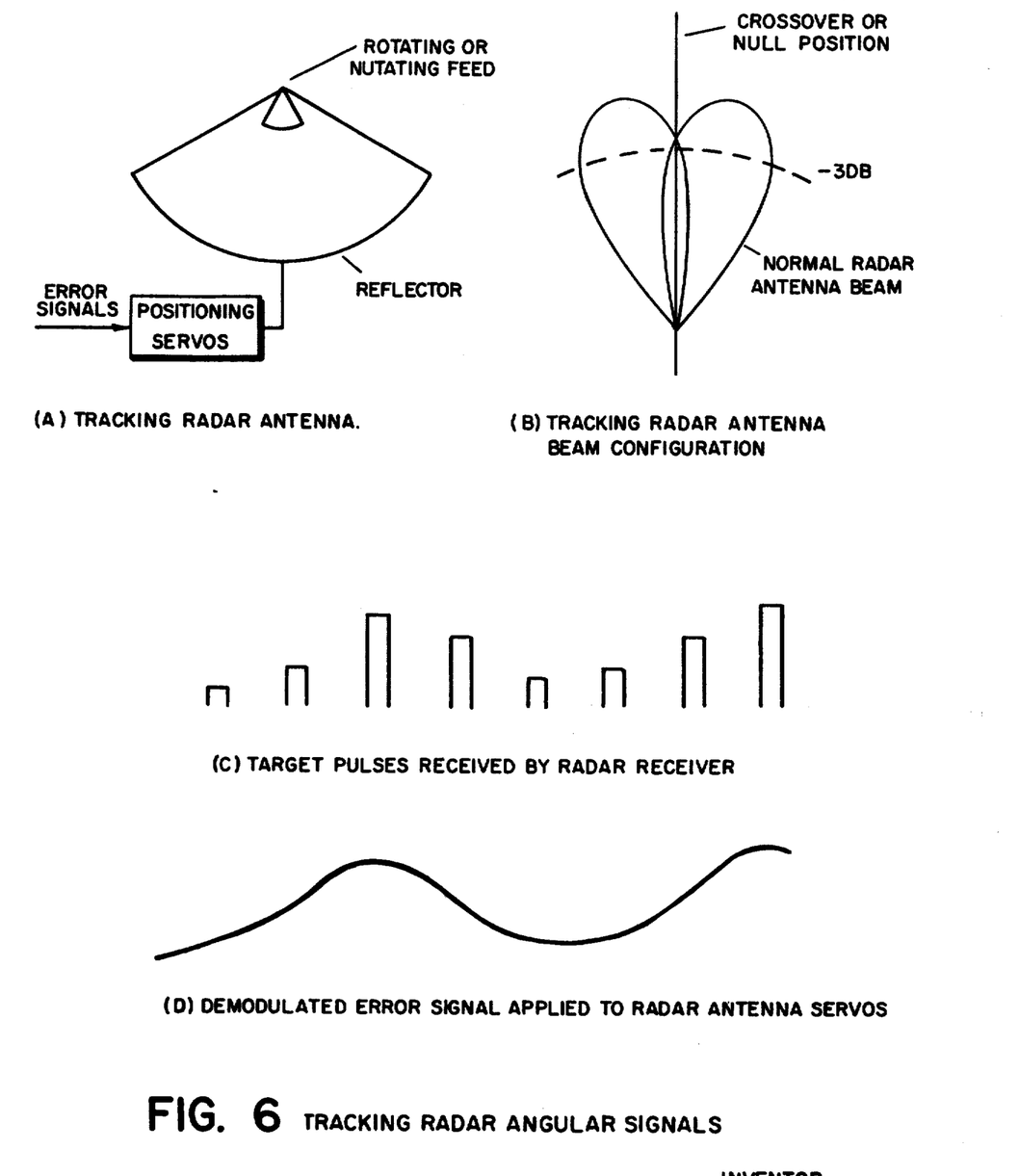
FIG. 6 illlustrates the tracking radar anguıar signals.

One of the most common modes of operation of a tracking radar is the use of a conically scanning antenna beam in order to obtain an exact angular lock on the target. This is done by continuously rotating or nutating the feed of a parabolic radar antenna in such a manner that the pencil beam is moved in space around a circle corresponding to one beam width of the antenna, as shown in FIG. 6. When the radar antenna beam is oriented in such a position that the cross-over points directly at the target, the signal received by the radar will have no modulation. However, if the direction of the radar antenna is slightly off the crossover point, the signal received by the radar receiver will be modulated at the scan frequency of the radar antenna. This signal is demodulated at the output of the radar receiver and results in a low frequency signal whose amplitude and phase is such that when fed to a servo system which controls the position of the radar antenna, it will so direct the radar antenna that it is brought precisely to the crossover point, thus providing a very accurate angular lock on the target. It is seen from the above that the demodulated scan frequency is a very important element used in a tracking radar in order to accurately track a target.

The angle track breaking repeater mode of operation is designed to counter a tracking radar of the type described above. This is done by receiving the signals from the radar which contain the scan frequency. These signals, which would be received in the beam of the multi-directional, barrage jamming system corresponding to the direction of the radar, would be passed through the circuit shown in FIG. 3. Since these signals contain the scan frequency of the radar, there is sufficient information present for the jamming system to use this signal in order to transmit a signal back to the radar at a high level with the phase reversal introduced by the switching unit 44 of FIG. 3. The high level is provided by the chain of traveling wave tube amplifiers 40, 41 and 42, as shown in FIG. 3. This chain of amplifiers converts a low level received signal at the input of TWT No. 1 (40) to a high level output signal at the output of TWT No. 3 (42). An amplifier chain of this type can provide gain as high as 100 db. Thus a low level received signal of approximately −30 dbm ($10^{-6}$ watts) can be transmitted at the output of the amplifier chain at a level of +70 dbm or 10,000 watts. In this manner, the signal received by the radar receiver from the jammer would be demodulated in the radar receiver and produce an error signal which would be of the incorrect phase and, therefore, would tend to throw the radar antenna away from its proper null position. Thus, the tracking radar would be unlocked from the target and would, in this manner, be unable to accomplish its normal tracking function. The phase reversal which is required in order to drive the conically scanning radar off track can be provided in a number of ways, all of which are quite familiar to the existing state of the art and, therefore, are not described in detail. One of the simplest ways of providing phase reversal is to pass the detected scan frequency signal through a single stage amplifier. The characteristics of a single stage amplifier are such that a 180° phase reversal is provided between the input and the output. The output of the amplifier is then applied as modulation to the final stage of the amplifier chain TWT No. 3 (42) which will modulate the output signal with 180° phase reversal as required in order to break lock on the tracking radar.

A jamming mode controller 52, through the switching unit 24, sets up the conditions for each receiver to operate as a track breaking repeater. In this case, the modulator 26 responds to a radar signal by producing a pulse modulation on the transmitter 30 in synchronism with the received signal. This pulse is transmitted through the appropriate beam corresponding to the direction of the receiver 20–20N which was energized. The scan modulation is picked up by the receiver 20–20N and would be used to modulate the pulse train of the transmitter 30 in order to break angle track of the radar. This system has a substantial advantage over conventional pulse repeaters in that different modulations can be received immediately from different directions by individual receivers and the transmitter can be modulated with a composite modulating signal corresponding to the individual modulations of different radars arriving from different directions on different beams of the jammer. In this manner angle track breaking is accomplished simultaneously against all of the radars in operation.

A similar procedure can be applied for gate snatching. Here again each receiver 20–20N operates independently against a specific signal received from a direction corresponding to a particular antenna beam. The conventional angle track breaking repeaters operate generally on the basis of peak detection and, therefore, can only be truly effective against one signal at a time since it must receive a total modulation envelope which requires several periods of the radar scan modulation. Only when the particular radar being jammed is thrown off angle track can be repeater operate against a successive number of radars. In this respect, it is not truly instantaneous since at best it must operate against one radar for a number of scan modulation periods.

The proposed jamming system does not suffer from this limitation since each receiver 20–20N can receive instantaneously the scan modulation corresponding to each directional beam to which the receiver is connected. It, therefore, has a substantial advantage in terms of traffic handling capacity generally proportional to the number of beams in the multi-directional antenna 10. Another very important advantage in the case of the repeater mode is the available gain in the antenna. This will be in the order of 20 db for a typical jamming antenna used with this system. Since conventional repeaters use essentially omni-directional antennas, it is possible by this method to eliminate 20 db gain from the repeater amplifier and, therefore, make use of substantially lower repeater transmitter power.

Figure 7:
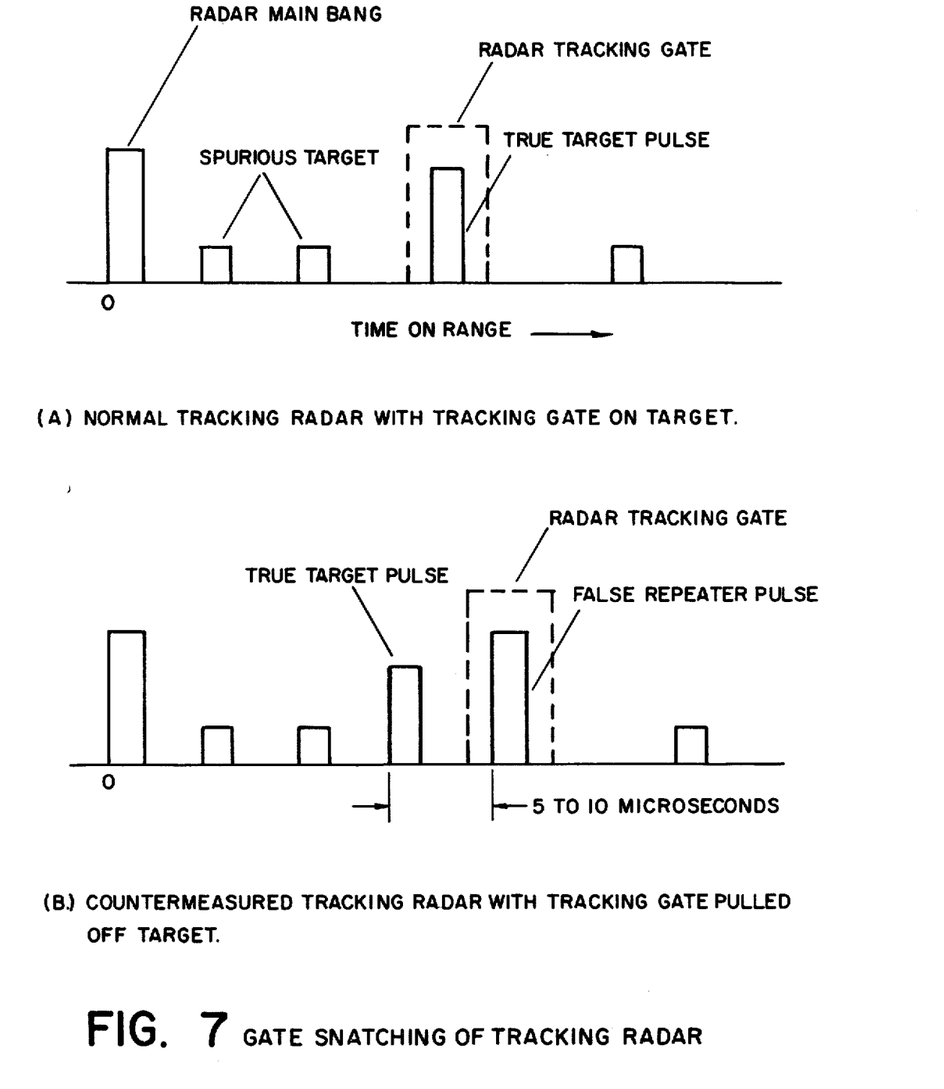
FIG. 7 illustrates the gate switching of tracking radar.

Gate snatching applies to a specific counter-measure that can be used against a tracking radar. A procedure which is used by all tracking radars for maintaining a lock on the target, in addition to the angle track described above, is to introduce a time position gate from the radar system which is positioned precisely around the target pulse received by the radar receiver. In this manner, all signals outside of the gate are rejected by the tracking radar and only the target pulse is used for the purpose of angle track as well as range track. Thus, three coordinates of the target, namely, azimuth, elevation (two orthogonal angles), as well as range, are obtained. If a means can be obtained in which the target pulse received by the radar can be made to assume a different position in time from that of the true target pulse, the radar track will be broken once the repeated pulse by the jammer is no longer transmitting. This is shown in FIG. 7 and is precisely what is accomplished in the gate snatching mode of the jammer. In this case, the jamming mode control 52 of FIG. 1 would be set by the operator to the gate snatching mode. In this case, the radar signal again would be received by the proper receiver 20 to 20N corresponding to the direction of the radar to the jammer. The radar pulses would be passed through the circuit corresponding to FIG. 3. The switching unit, in this case, would introduce a graduated delay in the received pulses in such a manner that the successive pulses would be delayed by fractions of a microsecond (assuming a normal tracking radar pulse of approximately one microsecond) until such time that the total delay of the transmitted pulse from TWT No. 3 (42) in FIG. 3 would be in the order of 5 to 10 microseconds. This would be well beyond the normal tracking radar gate width. In view of the relationship of the amplitude of the repeated pulse in the jammer compared to that of the normal echo received by the tracking radar, the tracking radar gate would follow the position of the repeated jammer pulse. After the delay of 5 to 10 microseconds, the jammer would begin transmitting again with zero delay and repeat the same cycle described above. The radar tracking gate would then be left hanging 5 to 10 microseconds away from the true target position and, in this manner, would break the track and destroy the information of the tracking radar.

Mode D — Multiple Spot Confusion

Another mode of operation for this system is the multiple spot confusion mode. This mode is particularly useful for confusion of search-type radar systems. Confusion is provided by producing a multiplicity of spots on the radar scope which makes it difficult for the operator to differentiate the actual target from the false spots which appear as true targets.

Figure 8:
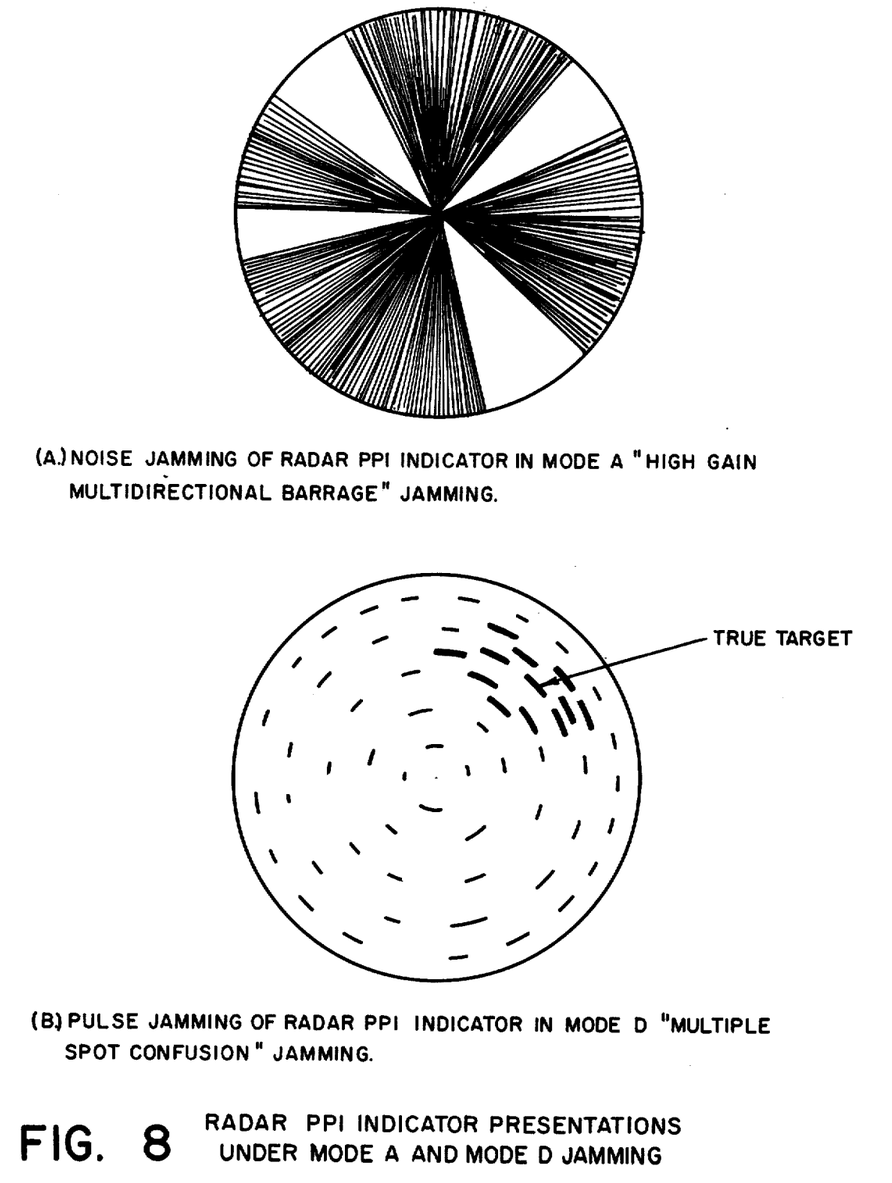
FIG. 8 is an indicator comparison of Mode a and Mode D.

In order to provide this mode, it is necessary for the system to be capable of providing a large number of transmissions at the exact radar frequency. Moreover, it must be capable of operating in a similar manner against as many radar signals as are likely to be dangerous to the aircraft at the particular time. For search radar this number is quite substantial. The advantage of the proposed jamming system for this application is the fact that it can separate radars by direction and does not require any special technique for remembering R-F frequency since it makes use of a barrage transmitting source. The only requirement again is that the crystal video receiver 20-20N generates, through the switching unit 24, pulses to the modulator 26 corresponding to the desired confusion signals. The R-F siwtch 22-22N in each beam will transmit the R-F pulses in the direction of the specific radar being jammed. Again the full gain of the antenna is helpful, both in receiving sidelobe signals from the radar and in transmitting confusing pulses back to the radar with sufficient radiating intensity to enter the sidelobes of the radar. Mode A operation is known as high gain, directional barrage. Mode D is multiple spot confusion. There is a very substantial difference between these two modes. In Mode A, the signal transmitted by the jammer is a noise modulated CW signal which produces a noisy response on all or portions of the radar indicator, depending on the range of the radar from the target. In Mode D, the signal that is produced by the jammer contains a series of pulses. These pulses appear on the radar scope as spots which can be similar in appearance to normal radar targets. Thus, in Mode D, the radar operator is confused between the actual target which is represented by a spot on the scope and a large number of false targets, represented by other spots on the scope due to transmission of the jammer. Frequently, in Mode D operation, the radar operator may not be aware that he is being jammed but may assume there is a large number of targets present, whereas in fact there is only one target and a number of false targets. Thus, in this case, a single aircraft using this mode of transmission can be made to appear to be a large number of aircraft, with its position being unable to be identified. In Mode A, the signal transmitted is a noise modulated signal which completely covers all or large portions of the radar scope. In this case, the operator is definitely aware of the fact that he is being jammed, and the purpose of jamming in this case is to obscure the scope completely or in part. The amount of average power required in Mode A is substantially larger in order to provide effective jamming, compared to that required in Mode D. In the latter case, power must be transmitted only during the time of the pulse transmission which, in general, is done at a relatively low duty cycle, whereas in Mode A, the transmission must be continuous in order to obliterate all or a large portion of the radar indicator. A comparison of the radar indicator in the two modes of operation is shown in FIG. 8.

Sidelobe Cancellation

Figure 4:
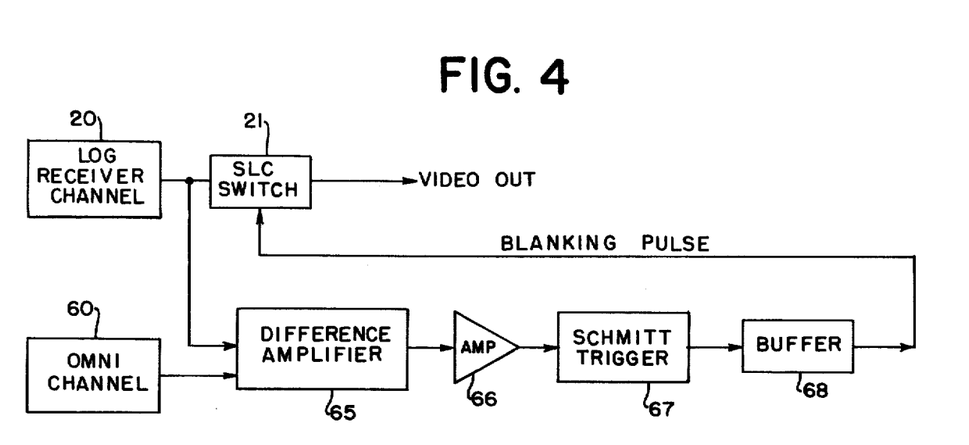
FIG. 4 is a diagram of a side-lobe cancellation system.
Figure 5:
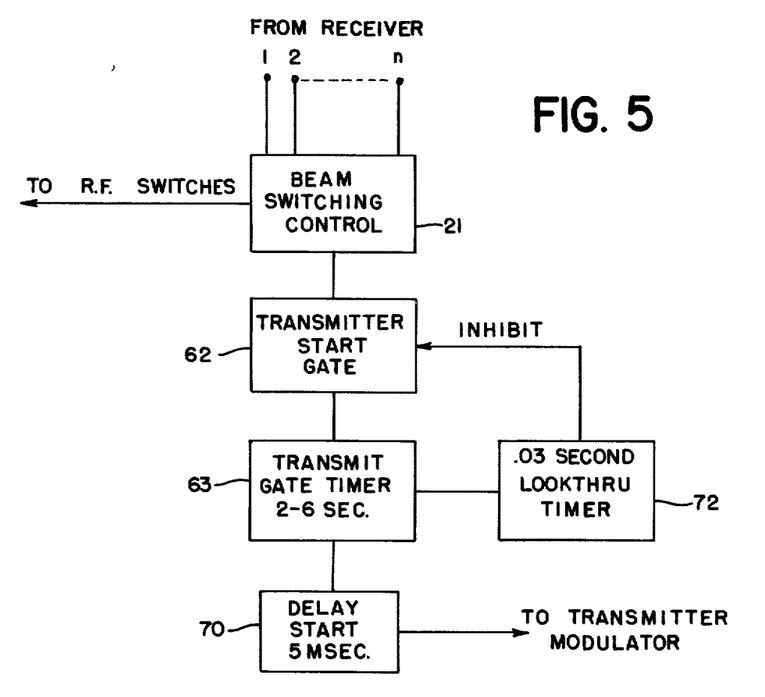
FIG. 5 is a block diagram of a suitable switching unit.

Although the antenna does produce a large number of highly directive beams, it does have sidelobe levels as is the case with any other antenna, since it is not an ideal device. The sidelobe level may be at all times less than 25 db below each main beam. Since the system is expected to operate over a dynamic range which will be greater than 25 db, unless some means is provided in the system for avoiding it, reception will be obtained in sidelobes, thus energizing beams not corresponding to the directions from which radar signals are being received. A sidelobe cancellation system is shown in FIG. 4. An omni-directional antenna channel 60 is provided which has a gain somewhat larger than the maximum sidelobe level of the directive antenna 10. This channel 60 is identical in characteristics to the separate receivers 20–20N used in the directive antenna channels. The outputs of each directive receiver 20–20N is compared with the output of the omni-directional receiver 60 in a sidelobe suppressor unit 64 comprising circuits 65–68. If the difference signal is positive, indicating that the directive receiver signal is greater than the omni-directional receiver signal, this is an indication that the received signal is in fact coming in on the main lobe of this particular channel and a gate or side lobe control switch is energized which delivers the output of the directional receiver 20–20N to the switching unit 24. If, on the other hand, the signal is negative, indicating the output of the omni-directional receiver is greater, the signal is indicated to be coming in on the sidelobe and the gate 21 of this directional antenna is not energized, thus preventing the switching unit 24 from opening up this particular beam. In this manner, only those signals coming in one the main lobes will be used for the purposes of turning these switches on. Sidelobe signals will be cancelled, and, therefore, will not energize the respective directional channels.

This system has been thoroughly tested and found to operate very satisfactorily in suppressing sidelobes of normal radar antennas. FIG. 1 shows how the sidelobe cancellation system is employed in one particular channel of the system (Channel 1). A similar sidelobe suppressor unit is used in each of the channels in order to prevent activation from signals being received on the sidelobes.

Figure 2A:
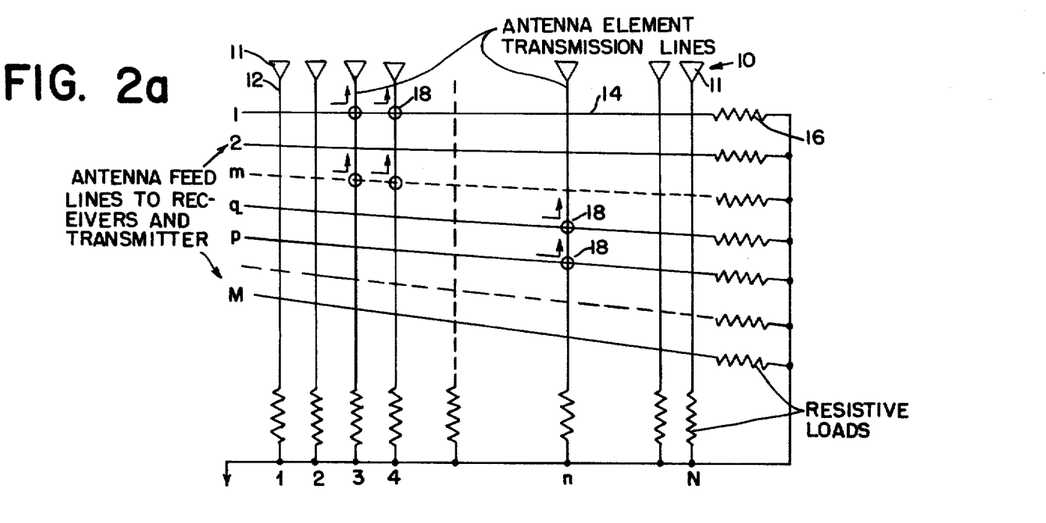
FIG. 2a is a schematic diagram of a multi-directional antenna.
Figure 2B:
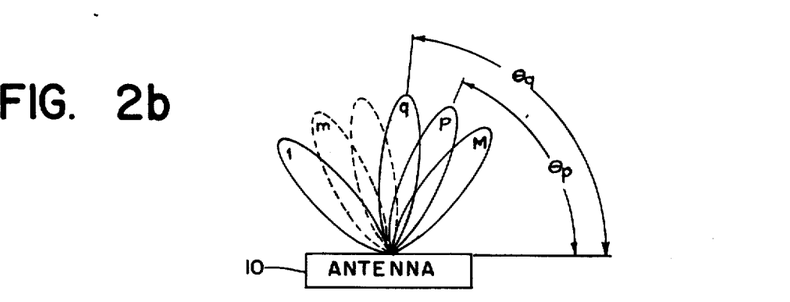

The basic antenna array shown in FIG. 2a is a linear array whose length is determined by the required gain of the system. Since the antenna is a linear, fixed array, it is not possible to obtain a full 360° coverage with a single antenna element. A single element can produce 90° coverage (±45° on either side of the axis). Therefore, a total of four antennas are required in a system which must produce 360° coverage for the carrying aircraft. Either separate jammers can be connected to each antenna or a single jamming transmitter can have its power distributed to the four antenna elements. In either case, each of the receiving beams is used in the same manner as in a single antenna element.

For antennas operating in the X-band and S-band regions, a summary of the principal design parameters is as follows. For X-Band (8,000 – 10,000 megacycles) an antenna gain of 23 db for each beam is provided with an aperture of 34 inches. This will produce a horizontal bandwidth in each beam of 2.5° and a total of 36 beams to cover an overall angle of 90° (±45° on each side of the axis.)

The antenna vertical beamwidth will be in the order of 50° to 60° and will be equivalent to that of a normal vertical pattern of an open end waveguide. This is necessary in order to provide sufficient vertical coverage without the need for scanning in a vertical plane.

As an indication of the effect of the gain provided in this antenna, the following relations apply. If a single 150-watt Carcinotron is rapidly swept over 1,000 megacycles, the power density would be 0.15 watts per megacycle. If an essentially omni-directional antenna having no gain is used, this will be the intensity of radiation in the direction of the radar. This value of 0.15 watts per megacycle is considered to be substantially below the minimum effective jamming level by a factor of at least 10 db. A system of this type would, therefore, not be satisfactory for adequate jamming, particularly against high gain fire control radars.

If, on the other hand, the same transmitter is used in the proposed jamming system, an additional factor of 23 db gain would be provided. Thus the effective radiated power in the direction of the radar in the proposed system would be greater by a factor of 200, or 30 watts per megacycles. This value of power will generally be more than adequate to effectively jam even the highest power fire control radars, equipped with substantial ECCM capability. Moreover, this can be accomplished against a number of different radars at different frequencies instantaneously with no reduction in watts per megacycle, providing the various radars being jammed are in the same beam. If several of the radars are operating in different beams of the jammer, there will be a corresponding reduction in effective watts per megacycle equal to the number of beams that are energized in the jammer.

A similar jamming system operating at S-band can be provided with an antenna which would be no greater in the dimension of the array than the X-band model. The S-band antenna would have a gain of 18 db and a horizontal beamwidth for each of the multi-directional beams equal to 7.5°. Thus a total of 12 beams would be provided to cover 90°. Since the radars operating in S-band are generally of the search type, reduction of 5 db in effective antenna gain would not reduce the jamming effectiveness. It can, therefore, be seen that a jamming antenna whose maximum width is approximately 34 inches could be provided in both the S- and X-band regions to provide extremely effective jamming over an angle of 90° for each antenna.

The following advantages can be ascribed to the jamming system:

1. Multi-Signal Capability

The proposed system can jam as many radars as may be operating within the overall bandwidth of the jamming system, which will be a minimum of 1,000 megacycles and as high as 2,000 megacycles in the microwave frequency band 1,000 – 11,000 megacycles. Greater bandwidths can be obtained for microwave frequencies up to 40,000 megacycles. This system will jam with equal effectiveness as many radars, within the total bandwidth of the system, as may be in operation in any one beam of the multi-directional antenna. Where several radars may be in operation in directions corresponding to different beams of the multi-directional antenna, the system will still operate effectively against these radars. However, the effective radiated power in watts per megacycle will be reduced by the number of jamming antenna beams in operation.

2. Enhancement of Available Transmitter Power

By the use of a high gain antenna, the effective radiated power of the jamming system is increased by the gain of the antenna which corresponds to the total aperture of the antenna. This is an extremely important improvement in effectiveness of the jammer and does not require the use of higher power transmitters, which may not be available or may be extremely costly. A typical design described in this report requires a 23 db gain, X-band antenna and an 18 8db gain, S-band antenna. This degree of gain will be directly added to the transmitter power and applied precisely in the direction from which the radar is operating. Thus the extremely important factor of high antenna gain, which is a normal part of a radar system design, is finally made available to the jammer, and thus helps it make a considerably better showing in the power battle that exists between these two types of systems.

3. Fixed, Flush Mounted Antenna

The jamming antenna used in this system is permanently fixed to the aircraft. Nevertheless it still provides high directivity over an angle of 90° for each separate antenna. The radiating aperture can be perfectly flush mounted to fit the contour of the aircraft. There is no need for a radome which would protrude from the normal aircraft surface.

3. Defeats Passive Detection Capability of Ground Radar System

By the use of the Multi-Directional, Non-Coherent Barrage mode of operation, the proposed jamming system will make it impossible for a passive detection system, employing noise correlation techniques to obtain a fix on the jamming aircraft. This is due to the fact that each of the passive detection receivers employed by the ground system will be receiving non-coherent ground signals radiated through separate antenna beams of the proposed jamming system. Thus the ground passive detection system will register these signals as originating from separate jamming sources which will provide excellent protection to the jamming aircraft from this otherwise extremely potent ground detection technique. In the high gain directional barrage mode, passive detection capability of the ground defense system will be minimized due to the fact that the jamming power will be transmitted only in the direction of the ground radar which is in operation and will be minimized down to the sidelobe level in all other directions which might conceivably contain passive detection devices. Thus in the above described operating Modes A and B of the jamming system, passive detection will be very severely impaired.

5. System Has Instantaneous Response

There is no requirement for tuning either a transmitter or receiver in the proposed system. All components are broadband. The transmitter operates in the barrage mode, covering all frequencies within its band with equal capability. The system can operate equally well against fixed tuned radars or variable tuned radars. It can even satisfactorily jam frequency diversity radars, which have the capability of changing frequency on a pulse-to-pulse basis. These radars represent the ultimate in ECCM radar capability. Nevertheless, if the total frequency diversity excursion is within the jamming barrage bandwidth, it will be completely jammed with high gain by the proposed jamming system.

6. Multi-Mode Operation

This system can operate in two primary modes, namely, Mode A: High Gain Directional Barrage, and Mode B: Multi-Directional, Non-Coherent Barrage. In addition, if a traveling wave tube type transmitter is employed, two additional modes, namely, Mode C: Track Breaking Repeater and Mode D: Multiple Spot Confusion can be provided. This provides the greatest possible degree of flexibility to the jammer for optimum performance against any type of airborne or ground radar, either Search, Acquisition or Track. Changing the modes of the system can be accomplished by simple changing of the setting of the jamming mode control in the system. All other components are essentially common to all modes.

7. Radar Directional Information

One of the special advantages of the proposed system is that it provides directional information with regard to the various radars that are being received and being jammed. This is due to the fact that since reception is obtained on individual beams, this information can readily be made available to the ECM operator by means of providing separate neon light indicators on the jamming Mode Control (52) of FIG. 1. This will provide a quantized PPI display to the ECM operator which can be used by him as a tactical display of the battle situation. He can derive from this display, information regarding the number of radars that are tracking him, as indicated by the number of beams being activated. He can also determine, to a large degree, the effectiveness of a particular mode of ECM being used, as indicated by the dropout of a particular radar in the presence of jamming. If a particular mode is not effective, he can switch to another mode in order to obtain greater effectiveness against that particular radar. In this manner, the ECM operator, for the first time, has a clear indication of the degree of threat he is facing from radars and the effectiveness of his ECM against these radars.

Figure 9:
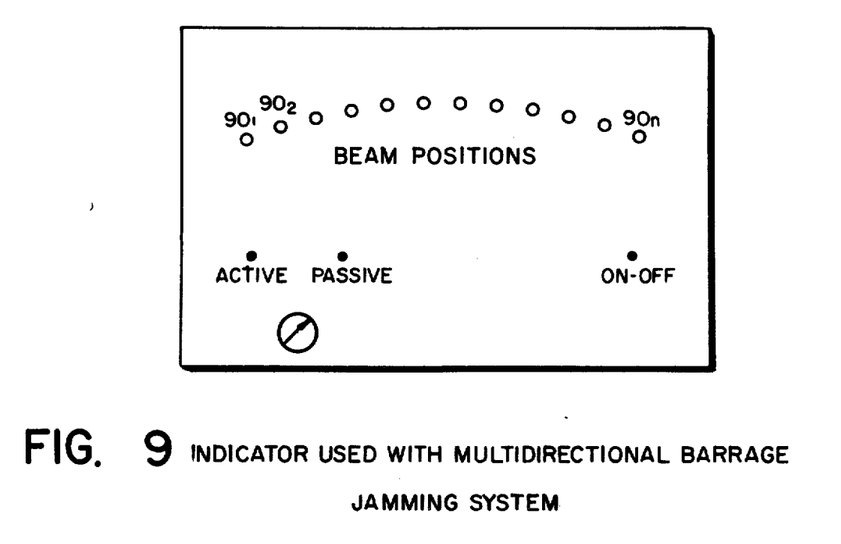

FIG. 6 shows an indicator of the type which may be used with the invention. Referring to FIG. 9, beam positions are indicated by individual neon lights $90_1$, $90_2$ ... $90_n$. These lights are in a 1:1 correspondence to the beam numbers of the Multi-Directional Barrage Jamming System. In addition, two neon lights in the lower left hand corner of the indicator are noted as active or passive. When the passive is on, this implies that the system is in the "Receive Only" mode and that the jamming transmitter is not turned on even though signals are received. In this case, lights will be lit corresponding to the specific beams in which signals are being received. When the switch in the lower left hand corner is thrown to the active position, the jamming transmitter will be energized in the direction from which signals are received. In this case, the lights $90_1$ to $90_n$ that are lit would indicate the actual beams through which the jamming transmitter is transmitting. The light in the lower right hand corner simply indicates whether the system is on or off.

8. Inherently Flexible System Design

Since the transmitter is connected to a composite R-F transmission system, it is inherently flexible. The number of transmitters can be anywhere from one to as large a number as desired, providing they are all connected to the R-F transmission line. Thus for a Carcinotron transmitter either one Carcinotron or a number of Carcinotrons can be employed to cover the entire barrage frequency band. Using more transmitters will increase the amount of effective watts per megacycle over the band. As shown above, even one 150-watt Carcinotron will provide greater effective radiated power than what can be provided now by a spot jammer in which the full power of the transmitter is applied within the frequency band of a single radar, at one frequency. Moreover the Carcinotron transmitter can be replaced by a traveling wave tube transmitter with no other change in the jamming system.

9. Simple, Reliable Circuit Design

The basic components in the proposed jamming system are simple. There are a relatively large number of similar, simple components employed, again making for extremely high reliability in the design. One of the major parts of the system, namely, the multi-directional antenna is a completely passive network which has been proven to be extremely reliable. The receiver is an extremely crystal video device which requires no tuning or critical adjustment. The transmitter is a straightforward barrage transmitter unit in which no great accuracy is required in its frequency setting elements. If a Carcinotron is employed it is not necessary that the sole electrode supply or beam electrode supply be too highly regulated as would be the case in a spot jamming system.

10. Satisfactory Performance in the Presence of ECCM Techniques

The proposed jamming system will operate effectively against radars which are equipped with the latest electronic counter-countermeasures devices. In particular, it will perform satisfactorily against a radar which is equipped with pulse-to-pulse frequency diversity. Moreover, it will operate effectively against the latest types of passive detection devices employing noise correlation techniques. It, therefore, fully meets the most stringent requirements that can be applied to a modern jamming system.

It will be understood that in order to avoid unnecessary complexities and to make the invention as easily understandable as possible, I have avoided unnecessary elaborations and expositions of elements which are known and understood by those familiar with this art, and other simplifications have been adopted to facilitate the understanding of the invention. Therefore, the disclosure is not to be considered as limitative, the true spirit and scope of the invention being defined in the following claims.

What I claim as new and desire to secure by Letters Patent is:

1. A jammer for radars or the like operating in a given frequency band, comprising an antenna system having an elongated radiation aperture and means for producing a multiplicity of simultaneous directional radiation beams, said means including a multiplicity of feed lines each connected so as to produce one of said beams, a plurality of fixed-tuned radio receivers each connected to one of said feed lines and having a radio frequency bandwidth sufficient to encompass said given frequency band, a transmitter for producing jamming waves having components extending throughout said given frequency band, a switching means connecting said transmitter to each feed line and responsive to the receiver connected to the same feed line, for causing said antenna system to radiate jamming waves in every direction from which signals of a predetermined amplitude are received.

2. A jammer according to claim 1, including sidelobe suppression means connected to each switching means for preventing said switching means from connecting the transmitter to its feed line, and receiving means connected to said antenna for receiving signals having a greater amplitude than sidelobe signals of said antenna and for operating said sidelobe suppression means.

3. A jammer according to claim 1, wherein the transmitter comprises a plurality of parallel connected Carcinotron oscillators, and electrical noise sources connected to the Carcinotron oscillators for frequency modulating them.

4. A jammer according to claim 1, wherein the transmitter comprises a plurality of series connected wide frequency band traveling wave tube amplifiers.

5. A jammer according to claim 1, including means responsive to the reception of a signal of a predeterined amplitude by one of said receivers for rendering the transmitter operative.

6. A jammer according to claim 5, including means for periodically switching off the transmitter for a fixed interval during jamming to provide "look-thru" operation of the jammer.

7. A jammer according to claim 1, including modulators connected to transmitter and means for energizing the several modulators non-coherently and connecting the outputs thereof to all feed lines simultaneously.

8. A jammer according to claim 1, including a modulator connected to said transmitter, a switching unit and a jamming mode control means connected to said modulator and said receivers for modulating said transmitter with pulses of received radar signals.

* * * * *